US 11,258,140 B2

(12) United States Patent
Jang et al.

(10) Patent No.: US 11,258,140 B2
(45) Date of Patent: Feb. 22, 2022

(54) SECONDARY BATTERY

(71) Applicant: Samsung SDI Co., Ltd., Yongin-si (KR)

(72) Inventors: Myung Jae Jang, Yongin-si (KR); Seung Ho Kwak, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 196 days.

(21) Appl. No.: 16/038,823

(22) Filed: Jul. 18, 2018

(65) Prior Publication Data

US 2019/0067668 A1     Feb. 28, 2019

(30) Foreign Application Priority Data

Aug. 31, 2017 (KR) .................. 10-2017-0111144

(51) Int. Cl.

| H01M 2/26 | (2006.01) |
|---|---|
| H01M 2/20 | (2006.01) |
| H01M 10/04 | (2006.01) |
| H01M 2/30 | (2006.01) |
| H01M 50/54 | (2021.01) |

(Continued)

(52) U.S. Cl.
CPC ....... *H01M 50/54* (2021.01); *H01M 10/0413* (2013.01); *H01M 50/502* (2021.01); *H01M 50/538* (2021.01); *H01M 50/543* (2021.01)

(58) Field of Classification Search
None
See application file for complete search history.

(56) References Cited

U.S. PATENT DOCUMENTS

| 8,268,478 B2 | 9/2012 | Kim et al. |
|---|---|---|
| 8,518,579 B2 | 8/2013 | Kim et al. |

(Continued)

FOREIGN PATENT DOCUMENTS

| CN | 101997104 A | 3/2011 |
|---|---|---|
| CN | 102738428 A | 10/2012 |

(Continued)

OTHER PUBLICATIONS

EPO Extended Search Report dated Jan. 7, 2019, for corresponding European Patent Application No. 18191363.3 (6 pages).

*Primary Examiner* — Amanda J Barrow
(74) *Attorney, Agent, or Firm* — Lewis Roca Rothgerber Christie LLP (57) ABSTRACT

Provided is a secondary battery, which can reduce defects of an uncoated portion of a current collector while ensuring a larger capacity and improving welding quality of the current collector. In one embodiment, the secondary battery includes a series of electrode assemblies each including a first electrode tab and a second electrode tab, a case accommodating the electrode assemblies, a cap plate coupled to the case at an opening in the case, a first current collector electrically connected to the first electrode tabs of the electrode assemblies, a second current collector electrically connected to the second electrode tabs of the electrode assemblies, and a first series of sub-tabs. A first sub-tab is coupled to the first electrode tab of a first electrode assembly, and a second sub-tab is coupled to the first electrode tab of a second electrode assembly. The first sub-tab is bent along a first boundary and the second sub-tab is bent along a second boundary.

14 Claims, 6 Drawing Sheets

(51) Int. Cl.
*H01M 50/502* (2021.01)
*H01M 50/538* (2021.01)
*H01M 50/543* (2021.01)

(56) References Cited

U.S. PATENT DOCUMENTS

| | | | |
|---|---|---|---|
| 8,940,420 B2 | 1/2015 | Han et al. | |
| 9,525,161 B2 | 12/2016 | Lee et al. | |
| 9,666,839 B2 | 5/2017 | Kim | |
| 9,799,874 B2* | 10/2017 | Han | H01M 2/263 |
| 9,911,962 B2 | 3/2018 | Kim | |
| 2003/0129479 A1* | 7/2003 | Munenaga | H01M 10/0463 429/94 |
| 2011/0039152 A1* | 2/2011 | Kim | H01M 2/1094 429/178 |
| 2011/0052963 A1* | 3/2011 | Lee | H01M 2/0237 429/148 |
| 2012/0251874 A1* | 10/2012 | Guen | H01M 2/348 429/179 |
| 2012/0282502 A1* | 11/2012 | Kim | H01M 10/04 429/82 |
| 2012/0321922 A1 | 12/2012 | Kim et al. | |
| 2013/0084471 A1* | 4/2013 | Han | H01M 2/348 429/7 |
| 2013/0095372 A1* | 4/2013 | Kim | H01M 2/18 429/178 |
| 2013/0252074 A1* | 9/2013 | Hsiao | H01M 10/425 429/159 |
| 2013/0260221 A1* | 10/2013 | Yoshitake | H01M 2/0215 429/179 |
| 2013/0302660 A1* | 11/2013 | Shiraishi | H01M 2/34 429/120 |
| 2013/0330593 A1* | 12/2013 | Kim | H01M 10/0413 429/149 |
| 2014/0087223 A1* | 3/2014 | Hamakawa | H01M 10/0413 429/94 |
| 2014/0154547 A1* | 6/2014 | Anderson | H01M 10/625 429/120 |
| 2014/0255780 A1* | 9/2014 | Mikhaylik | H01M 4/622 429/213 |
| 2014/0295242 A1* | 10/2014 | Kimura | H01M 10/613 429/120 |
| 2014/0302384 A1 | 10/2014 | Park et al. | |
| 2014/0315073 A1* | 10/2014 | Kim | H01M 2/266 429/160 |
| 2014/0315076 A1* | 10/2014 | Lee | H01M 2/30 429/179 |
| 2014/0321093 A1* | 10/2014 | Pande | G03F 7/32 361/807 |
| 2014/0349149 A1* | 11/2014 | Kim | H01M 2/263 429/61 |
| 2015/0004473 A1* | 1/2015 | Lim | H01M 4/364 429/160 |
| 2015/0024259 A1* | 1/2015 | Lee | H01M 2/22 429/178 |
| 2015/0024264 A1* | 1/2015 | Tononishi | H01M 2/263 429/186 |
| 2015/0079431 A1* | 3/2015 | Kim | H01M 2/22 429/61 |
| 2015/0111090 A1* | 4/2015 | Lee | H01M 4/78 429/163 |
| 2015/0140410 A1* | 5/2015 | Kim | H01M 2/26 429/160 |
| 2015/0140414 A1* | 5/2015 | Kim | H01M 2/06 429/179 |
| 2015/0171384 A1* | 6/2015 | Kim | H01M 2/30 429/149 |
| 2015/0194657 A1* | 7/2015 | Kim | H01M 2/04 429/161 |
| 2015/0207125 A1* | 7/2015 | Kishimoto | H01G 11/28 429/129 |
| 2016/0049635 A1* | 2/2016 | Park | H01M 2/263 429/161 |
| 2016/0099440 A1 | 4/2016 | Park et al. | |
| 2016/0276704 A1* | 9/2016 | Okabe | H01M 2/22 |
| 2017/0125778 A1* | 5/2017 | Iwasa | H01M 10/0431 |
| 2018/0316050 A1* | 11/2018 | Matsumoto | H01M 4/70 |

FOREIGN PATENT DOCUMENTS

| | | |
|---|---|---|
| CN | 104103777 A | 10/2014 |
| CN | 104300096 A | 1/2015 |
| CN | 104659324 A | 5/2015 |
| EP | 2506358 A1 | 10/2012 |
| EP | 2793292 A2 | 10/2014 |
| KR | 10-2014-0125256 A | 10/2014 |
| KR | 10-2015-0071530 A | 6/2015 |
| KR | 10-1683214 B1 | 12/2016 |

* cited by examiner

SECONDARY BATTERY

CROSS-REFERENCE TO RELATED APPLICATION

This application claims priority to and the benefit of Korean Patent Application No. 10-2017-0111144 filed on Aug. 31, 2017 in the Korean Intellectual Property Office, the contents of which in its entirety are herein incorporated by reference.

BACKGROUND

1. Field

The present invention relates to a secondary battery, which can reduce defects of uncoated portions of current collectors while ensuring a larger capacity and improving welding quality of the current collectors.

2. Description of the Related Art

Unlike a primary battery that cannot be charged, a secondary battery can be recharged. A low-capacity secondary battery including a single battery cell is used as the power source for various portable small-sized electronic devices, such as cellular phones and camcorders. A high-capacity secondary battery in which several tens of battery cells are connected in a battery pack is used as the power source for motor drives, such as those in hybrid electric vehicles.

Secondary batteries are manufactured in various shapes, such as a cylindrical shape and a prismatic shape. Secondary batteries are configured such that an electrode assembly formed by positive and negative electrode plates with a separator as an insulator interposed therebetween, and an electrolyte, are housed in a case, and a cap plate is coupled to the case. Positive and negative electrode terminals are connected to the electrode assembly and are exposed or are protruded to the outside through the cap assembly.

SUMMARY

Embodiments of the present invention provide a secondary battery, which can reduce defects of an uncoated portion of a current collector while ensuring a larger capacity and improving welding quality of the current collector.

According to an aspect of the present disclosure, there is provided a secondary battery including a series of electrode assemblies each including a first electrode tab and a second electrode tab, a case accommodating the series of electrode assemblies and having an opening, a cap plate coupled to the case at the opening in the case, a first current collector electrically connected to the first electrode tab of each of the series of electrode assemblies, a second current collector electrically connected to the second electrode tab of each of the series of electrode assemblies, and a first series of sub-tabs including a first sub-tab and a second sub-tab. The first sub-tab is coupled to the first electrode tab of a first electrode assembly of the series of electrode assemblies. The second sub-tab is coupled to the first electrode tab of a second electrode assembly of the series of electrode assemblies. The first sub-tab is bent along a first boundary. The first boundary is between the first sub-tab and one of the first and second current collectors. The second sub-tab is bent along a second boundary. The second boundary is between the second sub-tab and the one of the first and second current collectors.

The first sub-tab and the second sub-tab of the first series of sub-tabs may be formed at different positions along a lengthwise direction of the first or second current collector.

The first sub-tab may be closer to the cap plate than the second sub-tab along the lengthwise direction of the first or second current collector.

The first and second sub-tabs of the first series of sub-tabs may not overlap each other in the lengthwise direction of the first or second current collector.

The first and second sub-tabs of the first series of sub-tabs may be bent in a same direction with respect to the first or second current collector.

The first sub-tab and the second sub-tab of the first series of sub-tabs may each be integrally formed with the first or second current collector.

The first sub-tab and the second sub-tab of the first series of sub-tabs may each have a smaller thickness than the first or second current collector.

The first or second current collector may include a first region and a second region inwardly recessed relative to the first region.

The first series of sub-tabs may extend from an outer periphery of the second region.

Bent regions of the first and second sub-tabs of the first series of sub-tabs may extend in opposite directions.

The bent regions may cover the first or second current collector.

The secondary battery may include a side insulation member coupled to the first or second current collector at the outer periphery of the first series of sub-tabs.

The side insulation member may include protrusions engaged with holes formed in exposed regions of the first or second current collector.

The secondary battery may include a second series of sub-tabs including a first sub-tab and a second sub-tab. The first sub-tab of the second series of sub-tabs may be coupled to the second electrode tab of the first electrode assembly, and the second sub-tab of the second series of sub-tabs my be coupled to the second electrode tab of the second electrode assembly.

The first sub-tab of the second series of sub-tabs may be bent along a first boundary between the first sub-tab and the first or second current collector, and the second sub-tab of the second series of sub-tabs may be bent along a second boundary between the second sub-tab and the first or second current collector.

The first boundary and the second boundary my be on opposite sides of the first or second current collector.

DETAILED DESCRIPTION

Hereinafter, embodiments of the present invention will be described in more detail with reference to the accompanying drawings, in which exemplary embodiments of the invention are shown so as to be easily realized by those skilled in the art.

A construction of a secondary battery according to an embodiment of the present invention will now be described.

Figure 1:
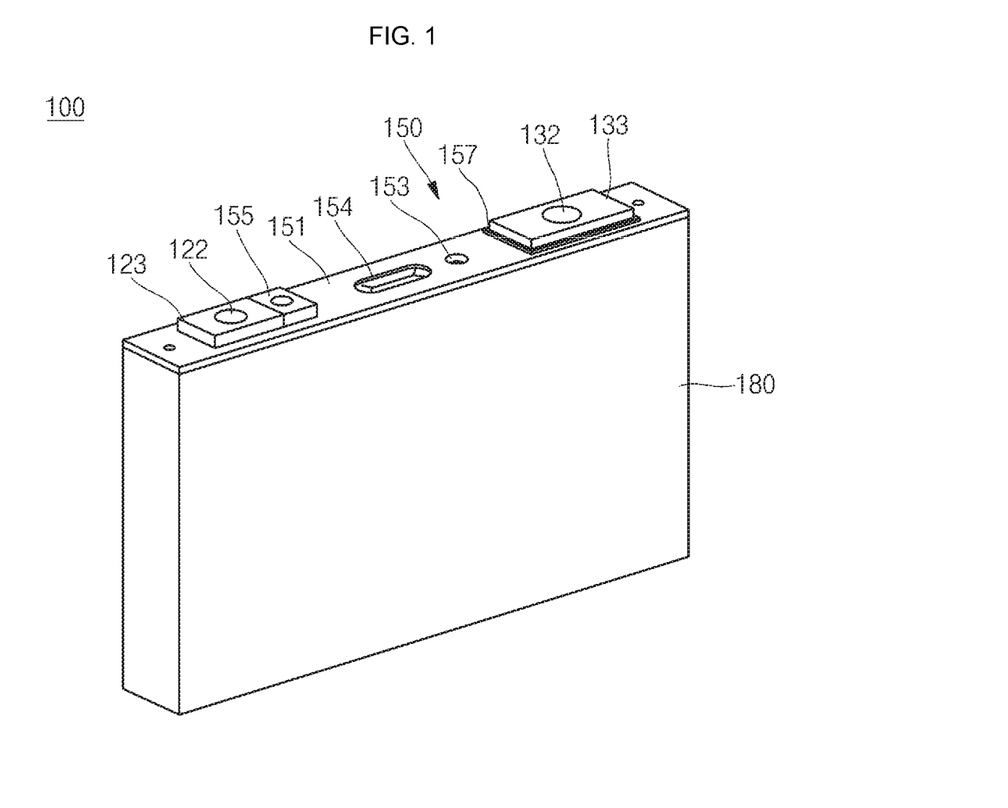
FIG. 1 is a perspective view of a secondary battery according to an embodiment of the present invention.
Figure 2:
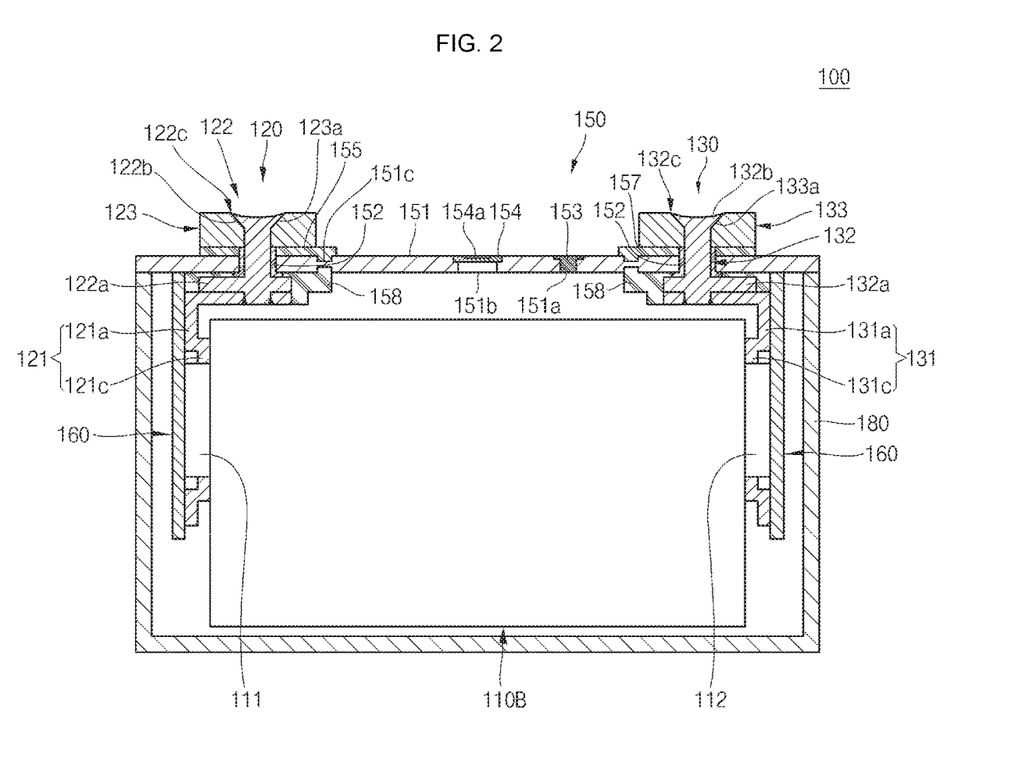
FIG. 2 is a cross-sectional view of a secondary battery according to an embodiment of the present invention.
Figure 3:
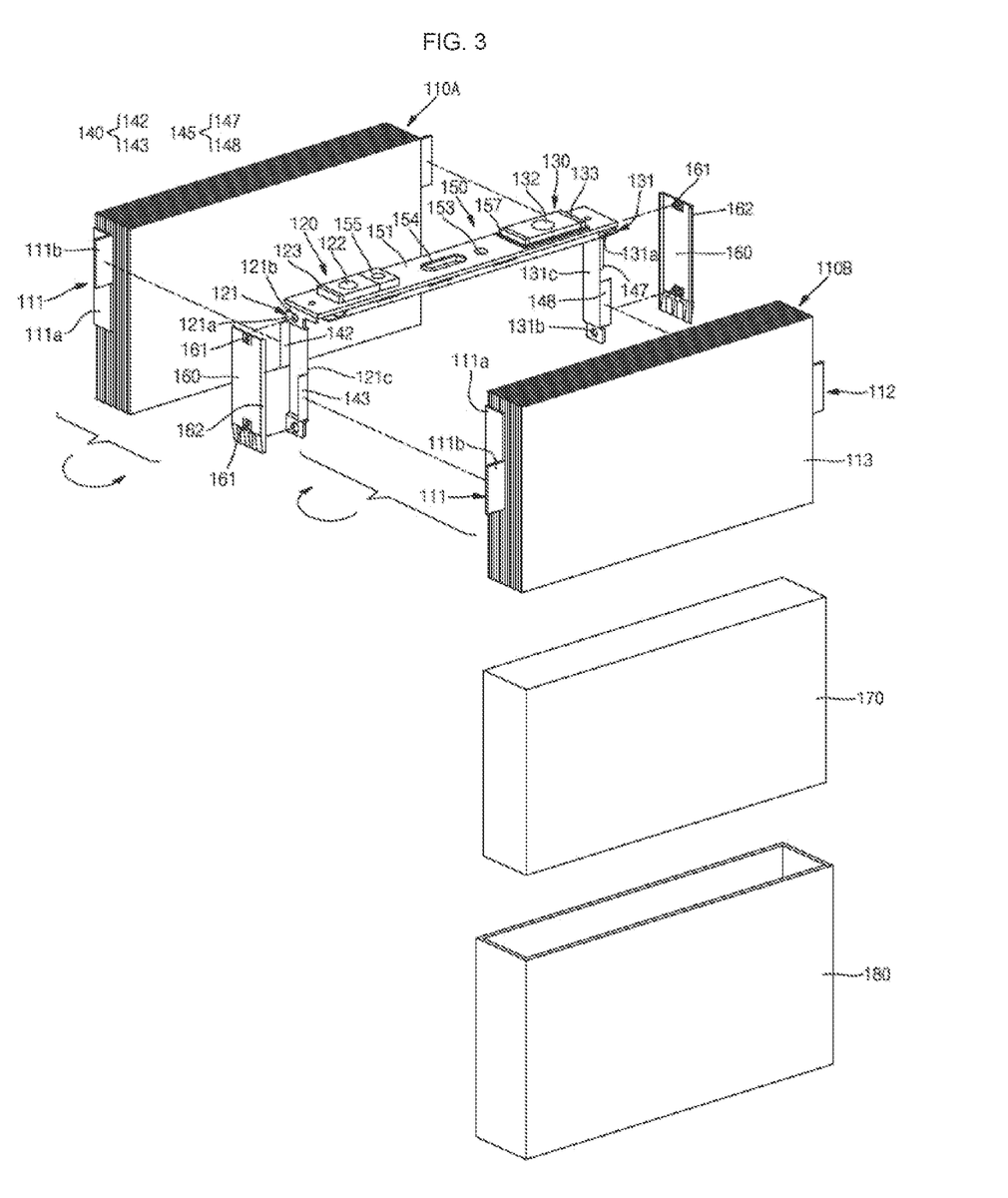
FIG. 3 is an exploded perspective view of a secondary battery according to an embodiment of the present invention.

FIG. 1 is a perspective view of a secondary battery according to an embodiment of the present invention, FIG. 2 is a cross-sectional view of a secondary battery according to an embodiment of the present invention, and FIG. 3 is an exploded perspective view of a secondary battery according to an embodiment of the present invention.

Referring to FIGS. 1 to 3, the secondary battery 100 according to an embodiment of the present invention includes electrode assemblies 110A and 110B, a first terminal assembly 120, a second terminal assembly 130, sub-tabs 140 and 145, a cap assembly 150, side insulation members 160, and a case 180. In addition, an insulation tape 170 may further be formed on outer surfaces of the electrode assemblies 110A and 110б.

The electrode assemblies 110A and 110б are provided as a pair of a first electrode assembly 110A and a second electrode assembly 110б, and each of the electrode assemblies 110A and 110б may be formed by winding or laminating a stacked structure including a first electrode plate, a separator, and a second electrode plate, which are thin plates or layers. In one embodiment, the first electrode plate may operate as a positive electrode and the second electrode plate may operate as a negative electrode. A person of ordinary skill in the art would appreciate that polarities of the first electrode plate and the second electrode plate may be switched.

The first electrode plate is formed by coating a first electrode active material, such as a transition metal oxide, on a first electrode current collector formed of a metal foil made of aluminum. The first electrode plate includes a first electrode uncoated portion that is a region without the first electrode active material coated thereon. The first electrode uncoated portion provides a passage of the flow of current between the first electrode plate and the outside. The present disclosure is not limited to the materials of the first electrode plate listed herein.

The second electrode plate is formed by coating a second electrode active material, such as graphite or carbon, on a second electrode current collector formed of a metal foil made of copper or nickel. The second electrode plate includes a second electrode uncoated portion that is a region without the second electrode active material coated thereon. The second electrode uncoated portion provides a passage of the flow of current between the second electrode plate and the outside. The present disclosure is not limited to the materials of the second electrode plate listed herein.

The separator may be positioned between the first electrode plate and the second electrode plate to prevent a short circuit and to allow the movement of lithium ions. The separator may be formed of polyethylene, polypropylene or a composite film of polyethylene and polypropylene. The present disclosure is not limited to the materials of the separator listed herein.

A first electrode tab 111 electrically connected to the first electrode uncoated portion and a second electrode tab 112 electrically connected to the second electrode uncoated portion may be formed at opposite ends of each of the electrode assemblies 110A and 110B.

In one embodiment, the first electrode tab 111 and the second electrode tab 112 may be constructed as separate lead tabs and then be electrically connected to the first electrode uncoated portion and the second electrode uncoated portion, respectively.

The first electrode tab 111 and second electrode tab 112 may be formed by stacking a plurality of first electrode uncoated portions and a plurality of second electrode uncoated portions. The first electrode tab 111 and second electrode tab 112 may also be referred to as multi-tabs. In one embodiment, uncoated portions of the respective electrode plates are used as electrode tabs, rather than using separate electrode leads connected to the uncoated portions, and therefore electrical resistance can be reduced and charging and discharging efficiencies can be increased. In addition, the first terminal assembly 120 and the second terminal assembly 130 are electrically coupled to the first electrode tab 111 and the second electrode tab 112, respectively, thereby performing charging and discharging operations.

In addition, the electrode assemblies 110A and 110B are housed in the case 180 together with an electrolyte. The electrolyte may include an organic solvent such as EC (ethylene carbonate), PC (propylene carbonate), DEC (diethyl carbonate), EMC (ethyl methyl carbonate), or DMC (dimethyl carbonate) and a lithium salt such as $LiPF_6$ or $LiBF_4$. In addition, the electrolyte may be in a liquid phase, a solid phase, or a gel phase.

In one embodiment, the electrode assemblies 110A and 110B are coupled to opposite sides of the first and second terminal assemblies 120, 130. That is, as shown in FIG. 3, the first electrode assembly 110A and the second electrode assembly 110B are coupled to opposite sides of the cap assembly 150. In addition, in one embodiment, the first electrode tab 111 and the second electrode tab 112 of the electrode assemblies 110A and 110B, which have the same polarity, are coupled to the first terminal assembly 120, thereby implementing a parallel connection of the first electrode assembly 110A and the second electrode assembly 110B and thereby increasing the battery capacity.

With this connection structure, the electrode assemblies 110A and 110B have reduced thicknesses, compared to a case where a single electrode assembly is provided. In one embodiment, at the time of forming the first electrode tab 111 and the second electrode tab 112, bending angles can be reduced by multi-tabs extending from the uncoated portions of the respective electrode plates, thereby reducing the rate of defects, e.g., folds. In addition, since the first electrode tab 111 and the second electrode tab 112 have reduced thicknesses, compared to a case where a single electrode assembly is provided, welding can be easily and stably performed when and the first electrode tab 111 and the second electrode tab 112 are welded to the terminal assembly 120.

The first terminal assembly 120 is made of a metal or an equivalent thereof and is electrically connected to the first electrode tab 111. The first terminal assembly 120 includes a first current collector 121, a first current collecting terminal 122, and a first terminal plate 123.

The first current collector 121 is electrically coupled to the first electrode tab 111 protruding to one side of each of the electrode assemblies 110A and 110B. In one embodiment, the first current collector 121 may be coupled to the first electrode tab 111 of each of the electrode assemblies 110A and 110B through the first plurality of sub-tabs 140, which are provided separately from the first current collector 121 and second current collector 131. The first current collector 121 may include a first region 121a coupled to the first current collecting terminal 122 at a lower portion of the cap assembly 150 and formed in an approximately L-shaped configuration, and a second region 121c inwardly recessed from a side portion of the first region 121a. In addition, coupling holes 121b may be formed at top and bottom ends of the side portion of the first region 121a.

The second region 121c may be formed on the side portion of the first region 121a (e.g., approximately at a vertically central portion of the side portion of the first region 121a). In addition, the second region 121c is formed to be recessed relative to the first region 121a in a direction facing the electrode assemblies 110A and 1106. In one embodiment, as will later be described, the second region 121c is integrally formed with the first plurality of sub-tabs 140, and the first plurality of sub-tabs 140 may be bent from outer peripheries of the second region 121c after the first plurality of sub-tabs 140 are coupled to the first electrode tabs 111 of each of the electrode assemblies 110A and 1106. Accordingly, additional components having dimensions corresponding to thicknesses of the first electrode tabs 111 and the sub-tabs 140 may further be coupled to the outer peripheries of the second region 121c, and the overall width of the additional components may correspond to a width of the first region 121a. Therefore, the first current collector 121 including the first region 121a and the second region 121c is configured to minimize an internal space loss within a predefined area of the case 180, and therefore the battery capacity can be increased.

In addition, the coupling holes 121b are provided to be coupled to the side insulation members 160, which will subsequently be coupled to the first region 121a from the side portion of the first region 121a. In one embodiment, the coupling holes 121b are provided to be engaged with corresponding protrusions of the insulation members 160. The side insulation members 160 coupled through the coupling holes 121b may insulate the first current collector 121, the first plurality of sub-tabs 140, and the first electrode tabs 111 of the electrode assemblies 110A and 1106 from the case 180.

The first current collector 121 may be made of aluminum or an aluminum alloy. However, the present disclosure is not limited to those materials of the first current collector 121 listed herein.

The first current collecting terminal 122 passes through the cap plate 151, upwardly protrudes and extends from the cap plate 151, and is electrically connected to the first current collector 121 under the cap plate 151. Like the first current collector 121, the first current collecting terminal 122 may also be made of aluminum or an aluminum alloy, but aspects of the present disclosure are not limited thereto. The first current collecting terminal 122 includes a flange 122a extending in a horizontal direction toward the first current collector 121, a rivet 122b upwardly protruding and coupled to a first terminal plate 123, and coupling portions 122c formed along the edge of the rivet 122b.

The flange 122a is horizontally formed on the first current collector 121. In addition, the flange 122a vertically protrudes from a region that passes through a terminal hole in the first current collector 121. In addition, welding is performed in a vicinity of the terminal hole, thereby coupling the first current collecting terminal 122 to the first current collector 121.

The rivet 122b protrudes upwardly from the flange 122a. The rivet 122b is riveted in a state in which it has passed through the first terminal plate 123, to mechanically and electrically connect the first current collecting terminal 122 to the first terminal plate 123. In addition, welding is performed along the edge of the rivet 122b to form the coupling portions 122c, thereby more stably maintaining the coupling of the rivet 122b.

The first terminal plate 123 may be made of aluminum or an aluminum alloy. The first terminal plate 123 has a sloping surface 123a downwardly tapered from a top portion of the terminal body. When the rivet 122b of the first current collecting terminal 122 is riveted, the rivet 122b may be easily compressed to be deformed. As the result, a coupling area can be increased through a surface contact. Accordingly, the first terminal plate 123 can be mechanically and electrically connected to the first current collecting terminal 122.

Additionally, in one embodiment, a fastening plate 155 is formed between the first terminal plate 123 and the cap plate 151. In addition, the first terminal plate 123 and the cap assembly 150 may have the same polarity, e.g., a first polarity, depending on the electric conductivity of the fastening plate 155. Alternatively, in one embodiment, the first terminal plate 123 and the cap assembly 150 may be electrically disconnected (e.g., electrically isolated) from each other.

The second terminal assembly 130 corresponding to the first terminal assembly 120 may have the same shape as the first terminal assembly 120. The second terminal assembly 130 is electrically connected to each of the electrode assemblies 110A and 1106. The second terminal assembly 130 may include a second current collector 131, a second current collecting terminal 132, and a second terminal plate 133.

The second current collector 131 may be made of copper or a copper alloy. However, the present disclosure is not limited to the materials of the second current collector 131 listed herein. The second current collector 131 may include a first region 131a formed in an approximately L-shaped configuration, and a second region 131c extending from the first region 131a and inwardly recessed in a direction facing the electrode assemblies 110A and 1106. The second region 131c is coupled to the second electrode tab 112 of each of the electrode assemblies 110A and 1106. In addition, the first region 131a of the second current collector 131 has a terminal hole to allow the second current collecting terminal 132 to be inserted into the terminal hole to then be welded to the second current collector 131. In addition, a coupling hole 131b may be formed in the first region 131a to be coupled to the side insulation member 160.

The second current collecting terminal 132 is connected to the second current collector 131 and protrudes from an upper portion of the cap plate 151. The second current collecting terminal 132 includes a flange 132a, a rivet 132b, and coupling portions 132c. In one embodiment, the second current collecting terminal 132 has a configuration corresponding to the configuration of the first current collecting terminal 122.

The second terminal plate 133 is coupled to the second current collecting terminal 132 and has a sloping surface 133a. A coupling force between the second terminal plate 133 and the rivet 132b of the second current collecting terminal 132 can be increased by the sloping surface 133a. In one embodiment, the second terminal plate 133 is coupled to the cap plate 151 through an insulation plate 157 disposed under the second terminal plate 133. Therefore, the second terminal plate 133 having a second polarity is electrically disconnected (e.g., electrically insulated) from the cap plate 151, thereby preventing a short circuit from occurring between electrodes.

The first plurality of sub-tabs 140 may include a first sub-tab 142 and a second sub-tab 143, and the second plurality of sub-tabs 145 may include a first sub-tab 147 and a second sub-tab 148, coupled to the first current collector 121 and the second current collector 131, respectively. The sub-tabs 140 and 145 may be formed to have the same material with the first current collector 121 and the second current collector 131, respectively. For example, the first and second sub-tabs 142, 143 coupled to the first current collector 121 may be made of aluminum or an aluminum alloy, and the first and second sub-tabs 147, 148 coupled to the second current collector 131 may be made of copper or a copper alloy. The first plurality of sub-tabs 140 and the second plurality of sub-tabs 145 may be provided separately from the first current collector 121 and second current collector 131 and then be connected to the first current collector 121 and the second current collector 131, respectively, by welding or using a conductive adhesive agent.

The first plurality of sub-tabs 140 may be provided separately from the first current collector 121, and the first and second sub-tabs 142 and 143 may be positioned at opposite sides of the second region 121c of the first current collector 121 to then be bent. In this embodiment, the first and second sub-tabs 142 and 143 are bent at their boundaries with respect to the second region 121c, forming an angle of approximately 90 degrees with respect to the second region 121c.

Initially, the first plurality of sub-tabs 140 may be parallel with the second region 121c of the first current collector 121. In addition, as shown in FIG. 3, the first and second sub-tabs 142 and 143 of the first plurality of sub-tabs 140 may be bent at approximately 90 degrees with respect to the second region 121c.

In addition, the first electrode tabs 111 of the electrode assemblies 110A and 110B may be coupled to the first and second sub-tabs 142 and 143, respectively. In addition, after the coupling of the first electrode tabs 111, the first and second sub-tabs 142 and 143 of the first plurality of sub-tabs 140 are again bent approximately 90 degrees so as to face the second region 121c, thereby covering the second region 121c.

Similar to the first plurality of sub-tabs 140, the second plurality of sub-tabs 145 is coupled to the second region 131c of the second current collector 131. In addition, the first and second sub-tabs 147 and 148 of the second plurality of sub-tabs 145 may be bent approximately 90 degrees with respect to the second region 131c. In such a state, the first and second sub-tabs 147, 148 may be coupled to the second electrode tabs 112 of the electrode assemblies 110B and 110A, respectively. Thereafter, the first and second sub-tabs 147 and 148 may be again bent approximately 90 degrees, thereby covering the second region 131c.

The cap assembly 150 is coupled to the case 180. In one embodiment, the cap assembly 150 includes the cap plate 151, the fastening plate 155, and the insulation plate 157. In addition, the cap assembly 150 may further include a gasket 152, a plug 153, a safety vent 154, and an insulation member 158.

The cap plate 151 seals the opening of the case 180 and may be made of the same material with the case 180. In one embodiment, the cap plate 151 may also be coupled to the case 180 by laser welding. Here, the cap plate 151 may be electrically connected (e.g., electrically insulated) to the first terminal assembly 120 or may be electrically disconnected from the first terminal assembly 120.

The gasket 152 may be formed between the first current collecting terminal 122 and the cap plate 151 and between the second current collecting terminal 132 and the cap plate 151. The gasket 152 may include an insulating material. The gasket 152 may close portions between the first current collecting terminal 122 and the cap plate 151 and between the second current collecting terminal 132 and the cap plate 151. The gasket 152 may prevent external moisture from penetrating into the secondary battery 100 and/or may prevent an electrolyte housed in the secondary battery 100 from flowing out.

The plug 153 seals an electrolyte injection hole 151a of the cap plate 151. In addition, the safety vent 154 is installed in a vent hole 151b of the cap plate 151, and a notch 154a may be formed on a top surface of the safety vent 154 to be opened at a preset pressure.

The fastening plate 155 is formed between the cap plate 151 and the first terminal plate 123. The fastening plate 155 may be made of the same material as the cap plate 151, for example, aluminum or an aluminum alloy, but aspects of the present invention are not limited thereto.

In addition, the fastening plate 155 includes a fastening protrusion, and a fastening groove 151c is formed in the cap plate 151 and is located to correspond to the fastening protrusion. Therefore, when the fastening plate 155 is coupled to the cap plate 151, the fastening groove 151c is engaged with the fastening protrusion inserted therein. Therefore, the fastening plate 155 can be stably coupled to the cap plate 151, and it is possible to prevent the fastening plate 155 from moving during manufacture or use. In addition, the first current collecting terminal 122 and the gasket 152 pass through the fastening plate 155, and the first current collecting terminal 122 may be coupled to the first terminal plate 123.

The fastening plate 155 may be made of either an electrically conductive material or an electrically insulating material. When the fastening plate 155 is made of an electrically conductive material, the first terminal assembly 120 may have the same material as the cap plate 151. Otherwise, when the fastening plate 155 is made of an electrically insulating material, the first terminal assembly 120 may be electrically disconnected (e.g., electrically insulated) from the cap plate 151.

The insulation plate 157 is formed between the second terminal plate 133 and the cap plate 151. The insulation plate 157 may have the same shape as the fastening plate 155 so as to be shaped to correspond to the fastening plate 155. However, the insulation plate 157 is made of an electrically insulating material to electrically disconnect (e.g., electrically insulate) the second terminal plate 133 having a second polarity from the cap plate 151 having a first polarity.

The insulation member 158 makes close contact (e.g., direct contact) with the cap plate 151. Moreover, the insulation member 158 may also make close contact (e.g., direct contact) with the gasket 152. The insulation member 158 tightly connects the first terminal plate 123 and the second terminal plate 133 to the cap plate 151. In one embodiment, the insulation member 158 is formed between the second current collector 131 and the cap plate 151 and between the case 180 and the second current collector 131 to prevent an unnecessary short circuit.

The side insulation members 160 may be provided as a pair and may be coupled to outer peripheries of the first and second current collectors 121 and 131, the first and second pluralities of sub-tabs 140 and 145, and the first and second electrode tabs 111 and 112 coupled to the outer peripheries of the first and second current collectors 121 and 131, respectively.

Each of the side insulation members 160 may be coupled to the coupling holes 121b or 131b of the respective first current collector 121 or the second current collector 131 through protrusions 161 formed at top and bottom ends of the side insulation member 160 according to the coupling position, thereby maintaining a coupling force.

In addition, each of the side insulation members 160 may further cover the first current collector 121 or the second current collector 131 through a wing portion 162 formed in a horizontally widthwise direction of the side insulation member 160, thereby preventing an electrical short circuit from occurring between electrodes.

The side insulation members 160 coupled to the first current collector 121 and the second current collector 131 are provided to have the same configuration as each other. Therefore, the respective side insulation members 160 can be employed in the same manner, irrespective of their polarities.

The insulation tape 170 may be formed to surround the electrode assemblies 110A and 110B from outer peripheries of the side insulation members 160. The insulation tape 170 may further cover an internal structure of the case 180, thereby preventing any possible short circuit from occurring between electrodes.

The case 180 may be made of a conductive metal, such as aluminum, an aluminum alloy or nickel plated steel, and may be substantially shaped of a hexahedron having an opening through which various components, including the electrode assemblies 110A and 110B, the first terminal assembly 120, and the second terminal assembly 130, etc., can be inserted into the case 180. In the secondary battery 100 according to one embodiment of the present disclosure, the first terminal assembly 120 is electrically connected to the cap plate 151 and the case 180, and the case 180 may have a first polarity, which is the same as a polarity of the first terminal assembly 120. Accordingly, since the internal surface of the case 180 is insulated, the case 180 may be electrically independent of the second electrode tab 112 of each of the electrode assemblies 110A and 110B or the second terminal assembly 130 having a second polarity, even if the second electrode tab 112 or the second terminal assembly 130 are brought into contact with the case 180 due to movement, thereby preventing occurrence of an electrical short circuit.

As described above, in the secondary battery 100 according to an embodiment of the present disclosure, the first and second current collectors 121 and 131 are respectively coupled to the first and second plurality of sub-tabs 140 and 145, respectively, which are coupled to the first and second electrode tabs 111 and 112, respectively, of each of the electrode assemblies 110A and 110B in a state in which the first and second sub-tabs 140 and 145 are firstly bent approximately 90 degrees and then secondly bent again approximately 90 degrees to be coupled to the first and second current collectors 121 and 131, respectively, while making contact with outer peripheries of the first and second current collectors 121 and 131, thereby easily manufacturing the secondary battery 100. In addition, an internal space loss of the case 180 can be reduced, thereby increasing the battery capacity.

Hereinafter, a construction of a secondary battery according to another embodiment of the present invention will be described.

Figure 4:
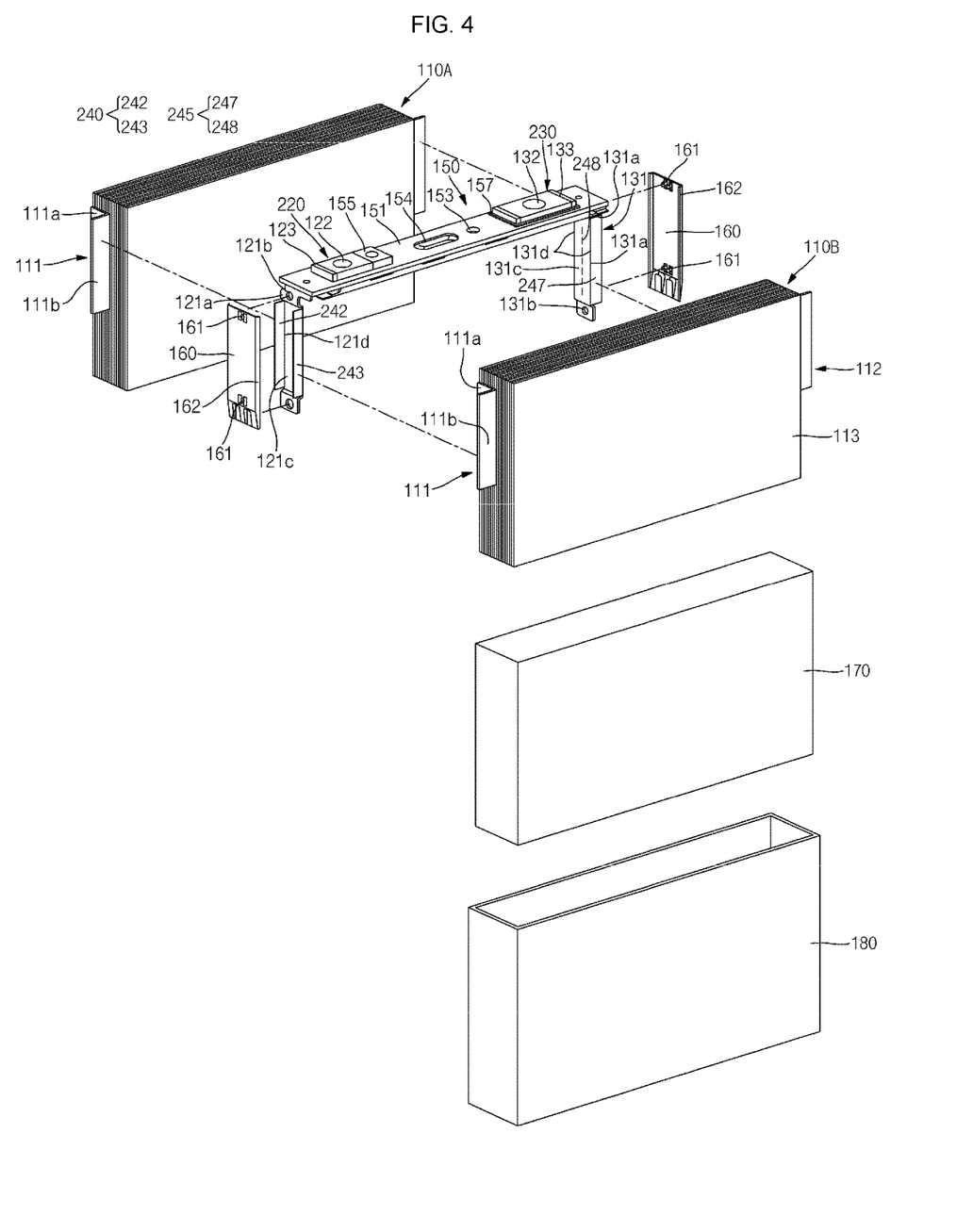
FIG. 4 is an exploded perspective view of a secondary battery according to another embodiment of the present invention.

FIG. 4 is an exploded perspective view of a secondary battery according to another embodiment of the present invention.

Referring to FIG. 4, the secondary battery according to another embodiment of the present invention may include electrode assemblies 110A and 110b, a first terminal assembly 220, a second terminal assembly 230, first and second pluralities of sub-tabs 240 and 245, a cap assembly 150, side insulation members 160, and a case 180. In addition, an insulation tape 170 may be formed on outer surfaces of the electrode assemblies 110A and 110b.

In one embodiment, the first plurality of sub-tabs 240 includes first and second sub-tabs 242, 243, and the second plurality of sub-tabs 245 includes a first sub-tab 247 and a second sub-tab 248. In addition, the first terminal assembly 220 may be configured such that the first current collector 121 and the first plurality of sub-tabs 240 are integrally formed with each other, and the second terminal assembly 230 may be configured such that the second current collector 131 and the second plurality of sub-tabs 245 are integrally formed with each other.

The first and second sub-tabs 242, 243 may be integrally formed with the second region 121c of the first current collector 121 and may be formed to have the same material as the second region 121c of the first current collector 121. The first and second sub-tabs 242, 243 may be formed by pressing. In addition, the thickness of each of the first and second sub-tabs 242, 243 may be smaller than that of the second region 121c of the first current collector 121, thereby allowing the first and second sub-tabs 242, 243 to be easily bent in a subsequent process. In addition, bending grooves may further be formed at boundaries 121d between the second region 121c of the first current collector 121 and the first and second sub-tabs 242, 243 to accommodate wrinkles created by the bending operation of the first and second sub-tabs 242, 243 of the first plurality of sub-tabs 240, thereby facilitating the bending operation of the first and second sub-tabs 242, 243.

In one embodiment, the first and second sub-tabs 242 and 243 of the first plurality of sub-tabs 240 are provided on edges along the second region 121c of the first current collector 121. In addition, the first sub-tab 242 and the second sub-tab 243 protrude in opposite directions toward an outer periphery (e.g., the outer side surface) of the second region 121c of the first current collector 121. In one embodiment, after the final bending operation of the first and second sub-tabs 242, 243 of the first plurality of sub-tabs 240 is finished, the first sub-tab 242 and the second sub-tab 243 may not overlap each other, which facilitates increasing the battery capacity.

The bending operation will now be described in greater detail. The first and second sub-tabs 242, 243 of the first plurality of sub-tabs 240 may be bent approximately 90 degrees into a state in which they are positioned on a plane parallel with the first electrode tab 111 of each of the electrode assemblies 110A and 110B. Thereafter, the first and second sub-tabs 242, 243 and the first electrode tab 111 of the electrode assemblies 110A and 110B, respectively, can be welded to each other. After the welding, welded portions of the first and second sub-tabs 242, 243 and the first electrode tabs 111 of the electrode assemblies 110A and 110b may further be bent 90 degrees and then be coupled to each other while making contact with the outer periphery (e.g., the outer surface) of the second region 121c.

In addition, as described above, a protrusion width of the first electrode tab 111 in the second region 121c of the first current collector 121 is smaller than that in the first region 121a of the first current collector 121, thereby preventing a capacity loss in the case 180.

The first and second sub-tabs 247, 248 of the second plurality of sub-tabs 245 may be integrally formed with the second region 131c of the second current collector 131 so as to correspond to the first and second sub-tabs 242, 243 and may have a smaller thickness than the second region 131c of the second current collector 131. In addition, bending grooves may be formed at boundaries 131d between the second region 131c and the first and second sub-tabs 247, 248 of the second plurality of sub-tabs 245. The first and second sub-tabs 247, 248 of the second plurality of sub-tabs 245 may be coupled to the second electrode tabs 112 of the electrode assemblies 110A and 1106, respectively, and may be substantially the same as the first and second sub-tabs 242, 243 of the first plurality of sub-tabs 240, except for the materials and coupling positions.

Hereinafter, a construction of a secondary battery according to still another embodiment of the present invention will be described.

Figure 5:
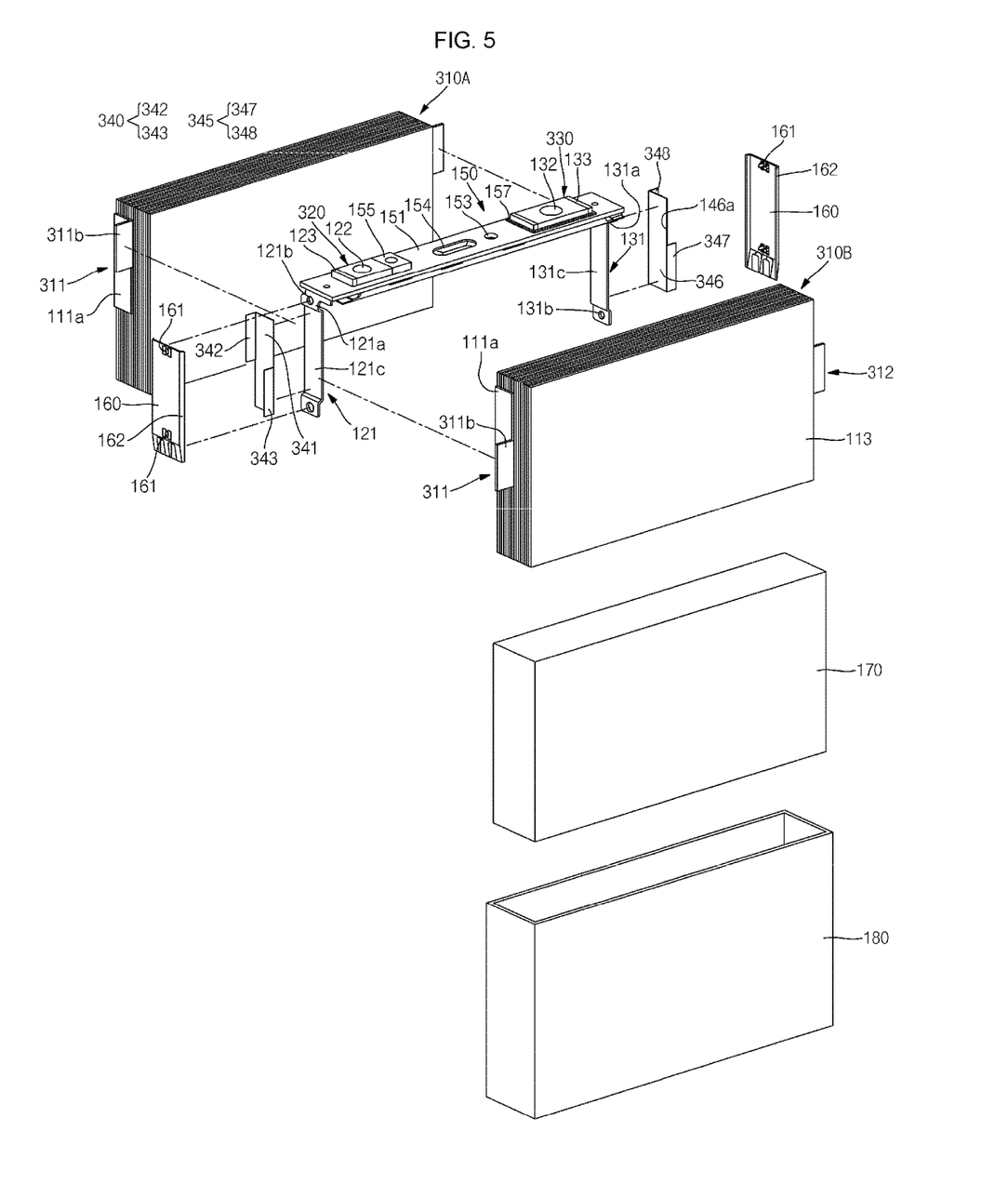
FIG. 5 is an exploded perspective view of a secondary battery according to still another embodiment of the present invention.

FIG. 5 is an exploded perspective view of a secondary battery according to still another embodiment of the present invention.

Referring to FIG. 5, the secondary battery according to still another embodiment of the present invention may include electrode assemblies 310A and 3106 each having electrode tabs 311 and 312, a first terminal assembly 320, a second terminal assembly 330, a first and a second plurality of sub-tabs 340 and 345, respectively, a cap assembly 150, side insulation members 160, and a case 180. In addition, an insulation tape 170 may be formed on outer surfaces of the electrode assemblies 310A and 310B.

The first plurality of sub-tabs 340 may include a coupled region 341 and first and second sub-tabs 342, 343, and the second plurality of sub-tabs 345 may include a coupled region 346 and first and second sub-tabs 347, 348.

The first and second sub-tabs regions 342 and 343 of the first plurality of sub-tabs 340 are provided at top and bottom sides, respectively, along a lengthwise direction of the second region 121c of the first current collector 121. In one embodiment, after the final bending operations of the first and second sub-tabs 342 and 343 of the first plurality of sub-tabs 340 are finished, the first sub-tab 342 and the second sub-tab 343 may not overlap each other, which facilitates increasing the battery capacity.

The second plurality of sub-tabs 345 may be symmetrical to the first plurality of sub-tabs 340 and may be substantially the same as the first plurality of sub-tabs 340, except for the materials.

Hereinafter, a construction of a secondary battery according to still another embodiment of the present invention will be described.

Figure 6:
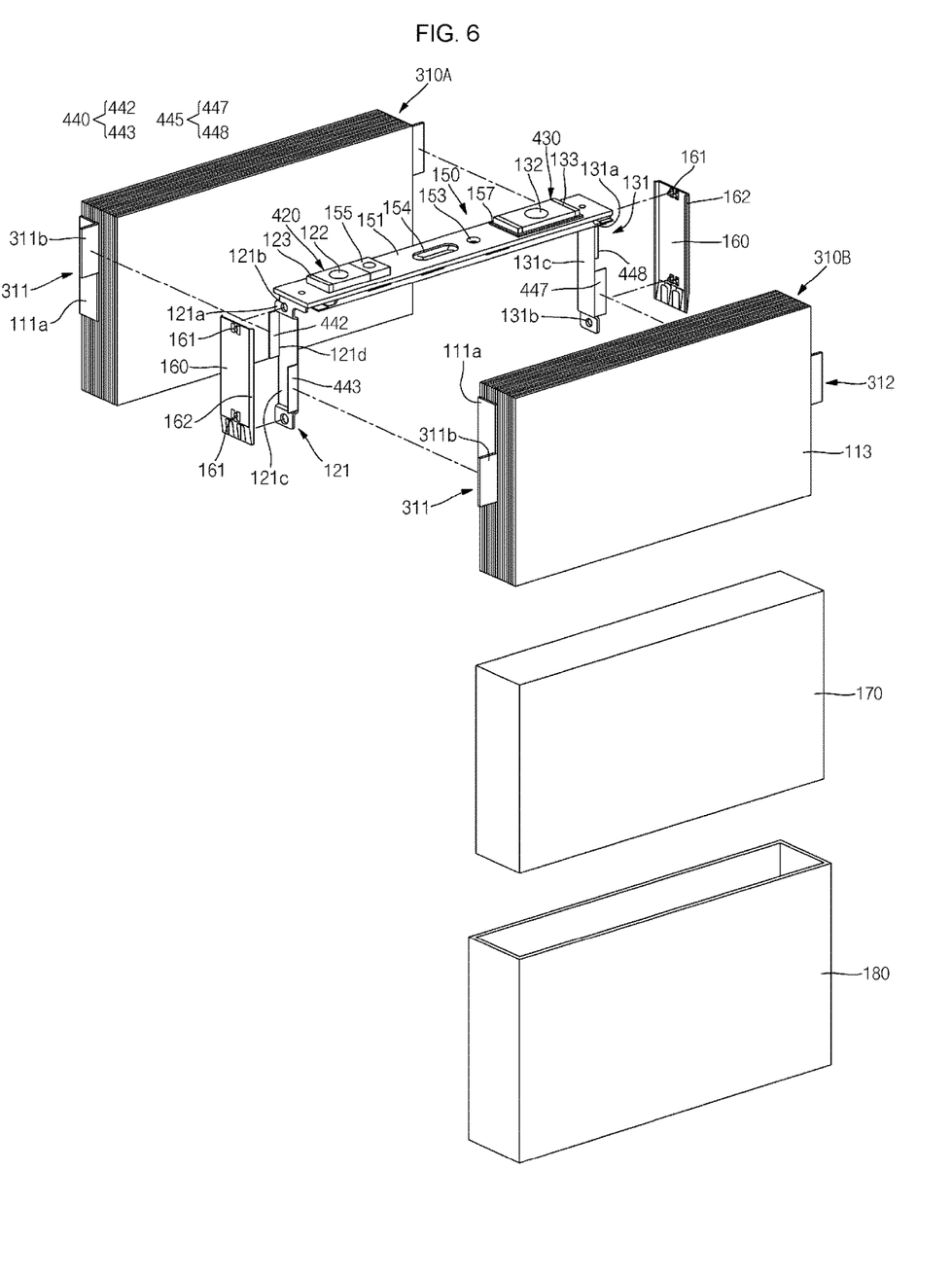
FIG. 6 is an exploded perspective view of a secondary battery according to still another embodiment of the present invention.

FIG. 6 is an exploded perspective view of a secondary battery according to still another embodiment of the present invention.

Referring to FIG. 6, the secondary battery according to still another embodiment of the present invention may include electrode assemblies 310A and 310B, a first terminal assembly 420, a second terminal assembly 430, a first and a second plurality of sub-tabs 440 and 445, respectively, a cap assembly 150, side insulation members 160, and a case 180. In addition, an insulation tape 170 may be formed on outer surfaces of the electrode assemblies 310A and 3106.

The first plurality of sub-tabs 440 may be integrally formed with the first terminal assembly 420 (e.g., integrally formed with the second region 121c of the first current collector 121), and the second plurality of sub-tabs 445 may be integrally formed with the second terminal assembly 430 (e.g., integrally formed with the second region 131c of the second current collector 131).

The first plurality of sub-tabs 440 may include a first sub-tab 442 and a second sub-tab 443. The first and second sub-tabs 442 and 443 may be integrally formed with the second region 121c of the first current collector 121 and may have smaller thicknesses than the second region 121c of the first current collector 121. The first and second sub-tabs 442, 443 may be formed by pressing.

In addition, bending grooves may be formed at boundaries 121d between the second region 121c of the first current collector 121 and the first and second sub-tabs 442, 443 to accommodate wrinkles created by the bending operation of the first and second sub-tabs 442, 443 of the first plurality of sub-tabs 440, thereby facilitating the bending operation of the first and second sub-tabs 442, 443.

In addition, the first and second sub-tabs 442 and 443 may be provided at top and bottom sides, respectively, along a lengthwise direction of the second region 121c of the first current collector 121.

The second plurality of sub-tabs 445 may be symmetrical to the first plurality of sub-tabs 440 and may be substantially the same as the first plurality of sub-tabs 440, except for the materials.

While the secondary battery according to the present invention has been particularly shown and described with reference to exemplary embodiments thereof, it will be understood by those of ordinary skill in the art that various changes in form and details may be made therein without departing from the spirit and scope of the present invention as defined by the following claims.

| Description of Reference numerals | |
|---|---|
| 100: Secondary battery | 110A, 110B: Electrode assembly |
| 120, 220, 320, 420: First terminal assembly | |
| 121, 221: First current collector | |
| 121a: First region | 121c: Second region |
| 121d: Boundary | 122: First current collecting terminal |
| 130: Second terminal assembly | |
| 131: Second current collector | |
| 131a: First region | 131c: Second region |
| 131d: Boundary | 132: Second current collecting terminal |
| 140, 240, 340, 440: First sub-tab | |
| 145, 245, 345, 445: Second sub-tab | |
| 150: Cap assembly | 152: Gasket |
| 155: Fastening plate | 157: Insulation plate |
| 158: Insulation member | 160: Side insulation member |
| 170: Insulation tape | 180: Case |

What is claimed is:

1. A secondary battery comprising:
a plurality of electrode assemblies each including a first electrode tab and a second electrode tab;
a case accommodating the plurality of electrode assemblies, the case having an opening;
a cap plate coupled to the case at the opening in the case;
a first current collector electrically connected to the first electrode tab of each of the plurality of electrode assemblies;
a second current collector electrically connected to the second electrode tab of each of the plurality of electrode assemblies; and
a first plurality of sub-tabs comprising a first sub-tab and a second sub-tab, the first sub-tab being coupled to the first electrode tab of a first electrode assembly of the plurality of electrode assemblies, the second sub-tab being coupled to the first electrode tab of a second electrode assembly of the plurality of electrode assemblies, wherein the first current collector comprises a first planar region and a second planar region parallel to the first planar region and inwardly recessed relative to the first planar region toward a side of each of the plurality of electrode assemblies, wherein the first sub-tab and the first electrode tab of the first electrode assembly are folded along a first boundary, the first boundary extending along the side of the first electrode assembly of the plurality of electrode assemblies, wherein the second sub-tab and the first electrode tab of the second electrode assembly are folded along a second boundary, the second boundary extending along the side of the second electrode assembly of the plurality of electrode assemblies, and wherein the first sub-tab and the second sub-tab extend from an outer periphery of the second planar region and face an outer surface of the second planar region of the first current collector facing away from the side of each of the plurality of electrode assemblies.

2. The secondary battery of claim 1, wherein the first sub-tab and the second sub-tab of the first plurality of sub-tabs are formed at different positions along a lengthwise direction of the first current collector.

3. The secondary battery of claim 2, wherein the first sub-tab is closer to the cap plate than the second sub-tab along the lengthwise direction of the first current collector.

4. The secondary battery of claim 2, wherein the first and second sub-tabs of the first plurality of sub-tabs do not overlap each other in the lengthwise direction of the first current collector.

5. The secondary battery of claim 1, wherein the first and second sub-tabs of the first plurality of sub-tabs are bent in a same direction with respect to the first current collector.

6. The secondary battery of claim 1, wherein the first sub-tab and the second sub-tab of the first plurality of sub-tabs are each integrally formed with the first current collector.

7. The secondary battery of claim 1, wherein the first sub-tab and the second sub-tab of the first plurality of sub-tabs each have a smaller thickness than the first current collector.

8. The secondary battery of claim 1, wherein the first and second sub-tabs of the first plurality of sub-tabs extend from opposite edges of the second planar region.

9. The secondary battery of claim 8, wherein the first and second sub-tabs of the first plurality of sub-tabs cover the second planar region of the first current collector.

10. The secondary battery of claim 1, further comprising a side insulation member coupled to the first current collector at the outer periphery of the first plurality of sub-tabs.

11. The secondary battery of claim 10, wherein the side insulation member includes protrusions engaged with holes formed in exposed regions of the first current collector.

12. The secondary battery of claim 1, further comprising a second plurality of sub-tabs comprising a first sub-tab and a second sub-tab, the first sub-tab of the second plurality of sub-tabs being coupled to the second electrode tab of the first electrode assembly, the second sub-tab of the second plurality of sub-tabs being coupled to the second electrode tab of the second electrode assembly.

13. The secondary battery of claim 12, wherein the first sub-tab of the second plurality of sub-tabs is bent along a first boundary between the first sub-tab and the second current collector, and wherein the second sub-tab of the second plurality of sub-tabs is bent along a second boundary between the second sub-tab and the second current collector.

14. The secondary battery of claim 1, wherein the first boundary and the second boundary are on opposite sides of the first current collector.

* * * * *